Nov. 12, 1957 W. NICHOLAS 2,812,809
PROJECTION SCREEN
Filed Dec. 16, 1954 3 Sheets-Sheet 3
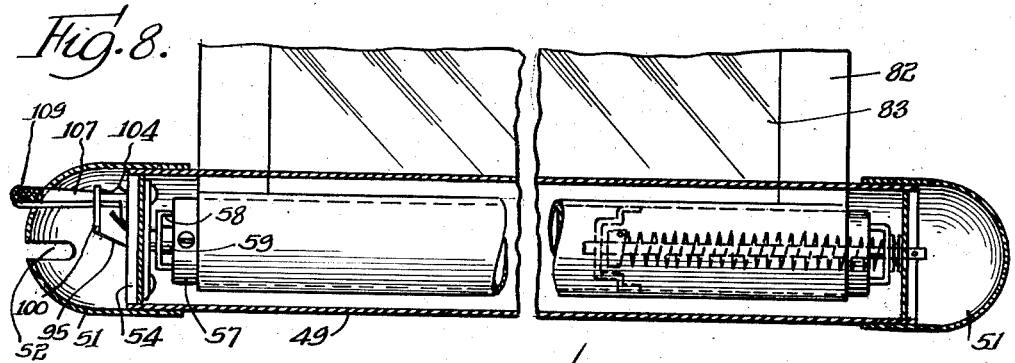
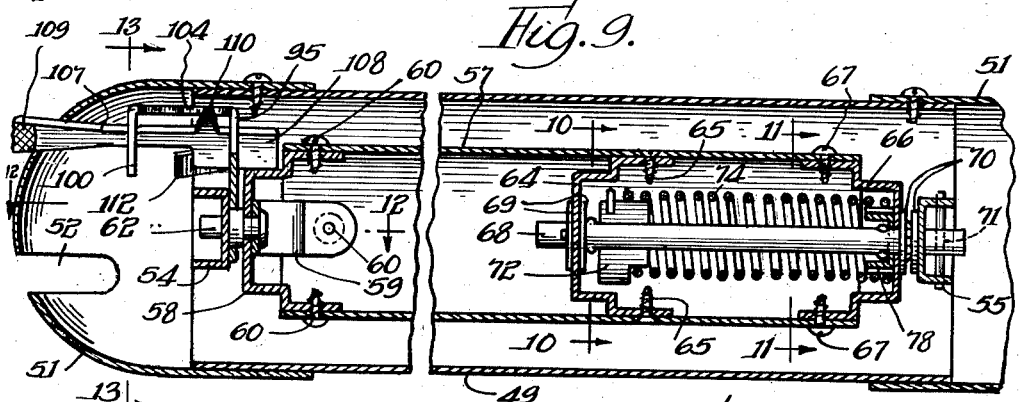
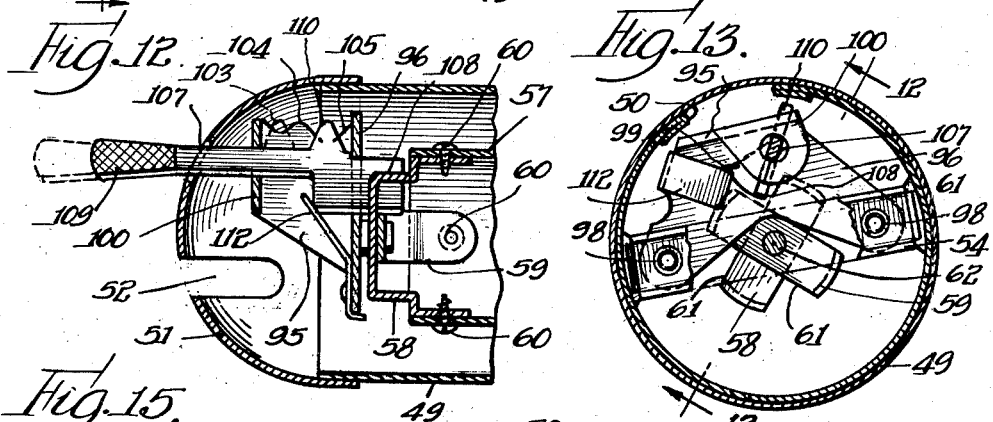
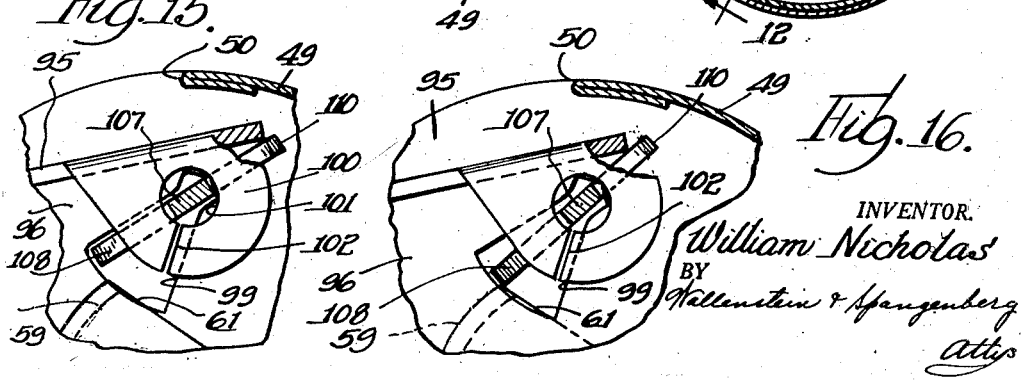
INVENTOR.
William Nicholas
BY Wallenstein & Spangenberg
Attys

United States Patent Office 2,812,809
Patented Nov. 12, 1957

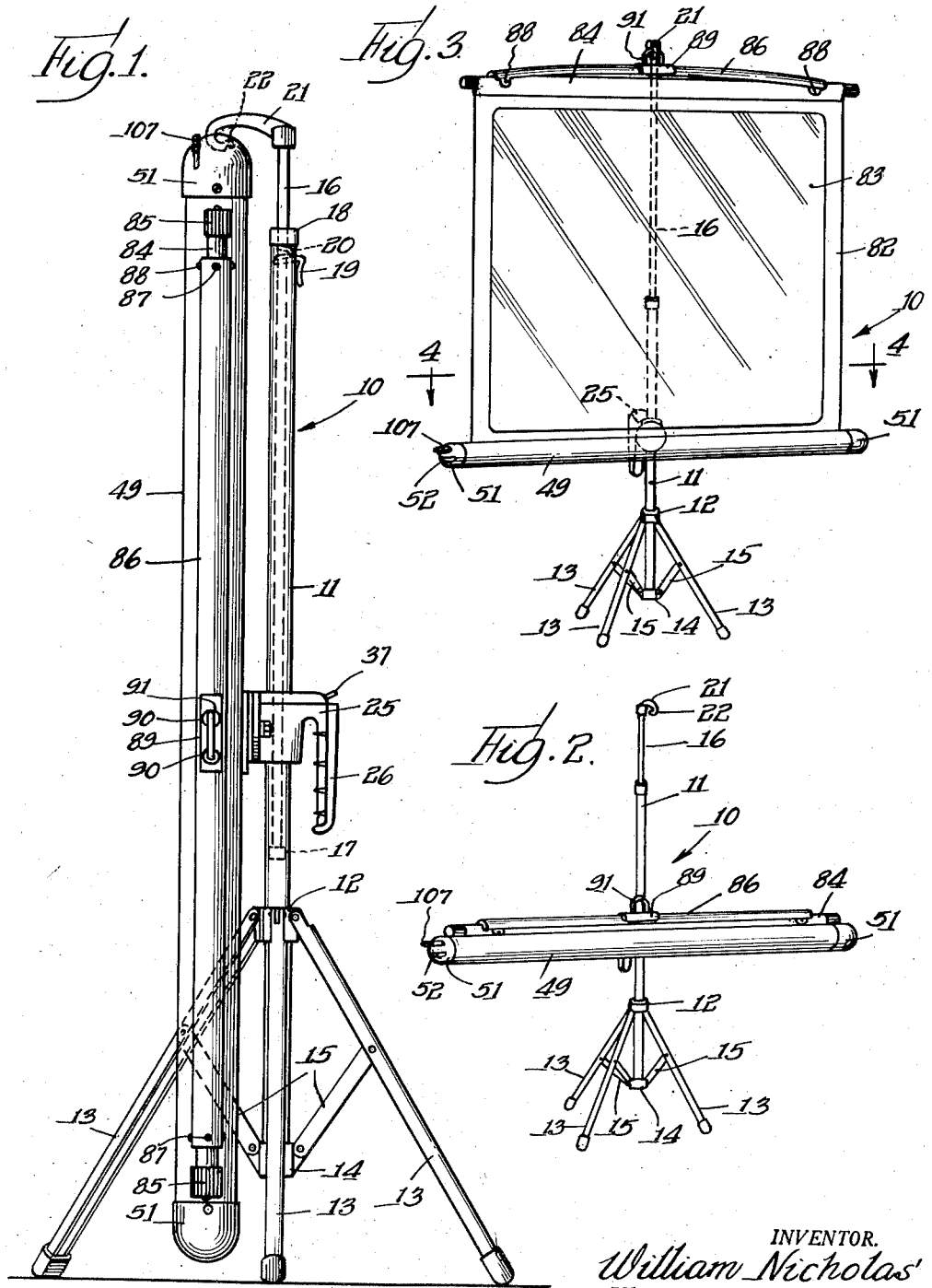

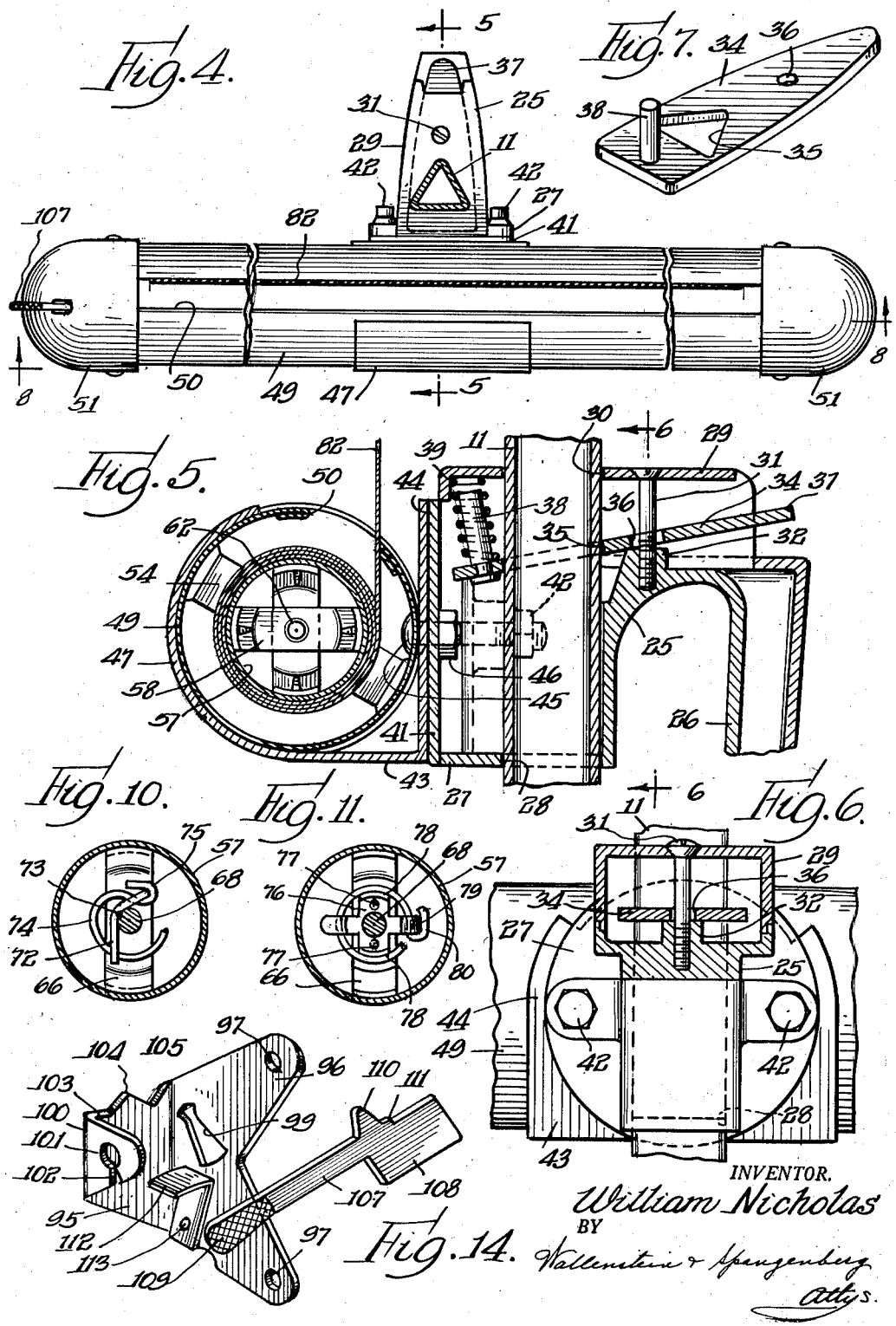

2,812,809

PROJECTION SCREEN

William Nicholas, Evanston, Ill., assignor to Radiant Manufacturing Corporation, Chicago, Ill., a corporation of Illinois Application December 16, 1954, Serial No. 475,751

4 Claims. (Cl. 160—24)

This invention relates to projection screens for use in exhibiting pictures projected thereon and is an improvement over the projection screen disclosed and claimed in my copending application Serial No. 418,946, filed March 26, 1954. This application is a continuation in part of my said copending application.

The principal object of this invention is to provide an improved projection screen which is particularly adaptable for use in exhibiting three dimensional pictures and wherein a flexible screen, carried by a roller mounted in a screen case, may be locked in said case when not in use and may be unrolled and tensioned to provide a substantially flat picture exhibiting surface, all in an improved and simplified manner.

Briefly, the projection screen comprises a supporting stand including a post, a handle member slidably mounted on the post, a screen case carried by the handle member, a spring actuated roller mounted on the screen case, a flexible screen secured at one end to the roller and adapted to be automatically rolled thereon and having a suspension slat at its other end, and a hook member slidably carried by the post and spaced from the handle member. The stand may be a collapsible stand having collapsible legs and having means for pivoting the screen case with respect to the stand. The projection screen is provided with manually controlled means operatively connected between the hook member and the post for releasably locking the hook member at any desired position along the post against movement toward the handle member, and also manually controlled means operatively connected between the handle member and the post for releasably locking the handle member at any desired position along the post against movement toward the hook member. Means including resilient means are provided for releasably securing the suspension slat to the hook member in picture exhibiting position when the screen is unrolled from the roller. Manually controlled means are also operatively connected between the screen case and the roller for releasably locking the roller against rotation in the unrolling direction to retain the screen in the screen case when rolled upon the roller and to allow tensioning of the screen in picture exhibiting position. In this arrangement, when the screen is located in picture exhibiting position and the handle and hook members are moved apart and locked while the roller is locked, the resilient means is tensioned to tension the screen in picture exhibiting position so that it forms a substantially flat exhibiting surface for the projected three dimensional pictures.

The manually controlled means for releasably locking the roller against rotation in the unrolling direction includes a plurality of substantially radially extending latch members extending from one end of the roller, a latch bar, and a bracket carried by the screen case adjacent said end of the roller and having means for slidably mounting the latch bar for movement substantially parallel to the axis of the roller between a retracted free position free from the latch members and an advanced locking position in the path of movement of the latch members. Means including spring means and cam members on the latch bar and bracket are provided for releasably retaining the latch bar in its retracted free position or in its advanced locking position and for tilting the latch bar outwardly beyond the path of movement of the latch members as the latch bar is moved between its retracted free position and its advanced locking position to prevent the latch members from impeding such movement of the latch bar.

Further objects of this invention reside in the details of construction of the projection screen and the manually controlled locking means for the roller, and in the cooperative relationships between the component parts thereof.

Other objects and advantages of this invention will become apparent to those skilled in the art upon reference to the accompanying specification, claims and drawings, in which:

Fig. 1 is a side elevational view of the projection screen of this invention with the legs of the supporting stand extended and with the screen case vertically arranged;

Fig. 2 is a perspective view of the projection screen with the screen case horizontally located and with the screen contained within the screen case;

Fig. 3 is a view similar to Fig. 2 but illustrating the screen in picture exhibiting position;

Fig. 4 is a horizontal sectional view taken substantially along the line 4—4 of Fig. 3;

Fig. 5 is a vertical sectional view taken substantially along the line 5—5 of Fig. 4;

Fig. 6 is a vertical sectional view taken substantially along the line 6—6 of Fig. 5;

Fig. 7 is a perspective view of the nipping lever located in the handle member as illustrated in Fig. 5;

Fig. 8 is a vertical sectional view taken substantially along the line 8—8 of Fig. 4;

Fig. 9 is an enlarged vertical sectional view similar to Fig 8;

Fig. 10 is a vertical sectional view taken substantially along the line 10—10 of Fig. 9;

Fig. 11 is a vertical sectional view taken substantially along the line 11—11 of Fig. 9;

Fig. 12 is a vertical sectional view taken substantially along the line 12—12 of Fig. 9 and 12—12 of Fig. 13;

Fig. 13 is a vertical sectional view taken substantially along the line 13—13 of Fig. 9;

Fig. 14 is an exploded perspective view illustrating the manually controlled locking means for the roller;

Fig. 15 is a view similar to Fig. 13 but illustrating the latch bar being moved from its retracted free position to its advanced locking position, the latch bar being shown in its advanced locking position in Fig. 13;

Fig. 16 is a view similar to Figs. 13 and 15 but illustrating the latch bar in its retracted free position.

Referring first to Figs. 1 to 3, the projection screen of this invention is generally designated at 10. It includes an upright tube 11 which may be generally triangular in cross section. A bracket 12 is slidably carried on the upright tube 11 and a plurality of legs 13 are pivotally secured to the bracket 12. Fixed to the bottom of the upright tube or post 11 is a bracket 14 and links 15 are pivotally secured to the bracket 14 and to the legs 13. The legs 13 may be folded together for transportation purposes and when this is done, the bracket 12 slides upwardly on the upright tube or post 11. Suitable latch means (not shown) are preferably provided for holding the legs 13 in collapsed position. When the legs are extended for picture exhibiting purposes as illustrated in Figs. 1 to 3, the bracket 12 slides downwardly on the upright post 11. In this way, the supporting stand is maintained in an upright position. An extension rod 16 is slidably mounted in the upright tube or post 11, the extension rod being guided for vertical movement by a collar 17 carried on the lower end of the extension rod and a cap 18 carried on the upper end of the post 11.

The extension rod 16 is maintained in any desired extended position by a nipping lever 19 extending through a suitable opening in the upright tube or post 11 and gripping the extension rod 16. The nipping lever is resiliently urged into gripping position by means of a spring 20 and the action of this spring may be overcome by manually manipulating the nipping lever 19 to allow desired adjustment of the position of the extension rod 16. The upper end of the extension rod 16 carries a bracket 21 having a hook portion 22. There is thus provided a hook member which is slidably and adjustably carried by the post.

A hollow handle member 25 having a handle portion 26 and a circular portion 27 is slidably carried on the upright tube or post 11. In this connection, it is provided with an opening 28 for receiving the post 11. The handle member 25 is also provided with a cover 29 which is provided with an opening 30 for receiving the post 11. The cover 29 is secured to the handle member 25 by a screw 31 screw threaded into a boss 32 having a shoulder. Located within the hollow handle member 25 is a nipping lever in the form of a plate 34 having an opening 35 conforming to and receiving the post 11. The plate 34 also has a hole 36 for accommodating the screw 31 and is provided at one end with an extension 37 forming a manipulating finger which extends outwardly from the hollow handle member 25. The other end of the plate 34 is provided with a spring seat 38 in the form of a post. The plate 34 is fulcrumed on one side on the shoulder 32 of the hollow handle member 25. Around the post 38 and extending between the cover 29 and the other side of the plate 34 is a compression spring 39. This compression spring 39 operates to tilt the plate 34 about the fulcrum 32 to cause the edges of the opening 35 in the plate 34 to engage and grip the opposite sides of the post 11. In this position, the nipping lever forcibly engages the post 11 and prevents relative motion therebetween in either direction. Movement of the handle member 25 upwardly with respect to the post 11 is prevented by the shoulder 32 engaging the nipping lever 34. It is noted that the post 38 extends in close proximity to the cover 29 and the post 38 and the cover 29 operate as a stop means. When the handle member 25 is pushed downwardly the post 38 engages the cover member 29 and prevents further downward movement of the handle member 25. Thus, with the nipping lever 34 in the position shown in Fig. 5 upward and downward movement of the handle member 25 with respect to the post 11 is prevented. In other words, the handle member 25 is releasably locked to the post 11 against movement in either direction. When, however, the extension finger 37 of the nipping lever 34 is pressed downwardly the nipping lever is fulcrumed about the shoulder 32 to release the edges of the opening 35 from the post 11. When this is done, the handle member 25 may be freely moved upwardly and downwardly along the post 11 to any desired position. When the nipping lever 34 is released, it automatically grips the post 11 and locks the handle member 25 in the adjusted position on the post 11.

A circular plate 41 is secured to the circular portion 27 of the handle member 25 by bolts and nuts 42. A bracket 43 having a flat leg 44 is pivotally mounted on the plate 41 by means of a bolt 45 and nut 46. The bracket 43 is also provided with a curved leg 47 to which is secured, as by spot welding, a screen case 49 having a slot 50 therein. The bolt 45 in addition to extending through the bracket leg 44, also extends through the screen case 49 as illustrated in Fig. 5. A pair of closure caps 51 are removably secured to the ends of the cylindrical screen case 49 and one of these caps is provided with a slot 52 which is adapted to receive the hook portion 22 of the hook member 21 when the screen case is arranged in vertical position as illustrated in Fig. 1. As shown in Figs. 2 and 3, the screen case 49 may be swung from its vertical position to a horizontal position, this being afforded by the pivotal connection between the screen case and the handle member 25.

Located at each end of the screen case 49 are supporting members 54 and 55. These supporting members are preferably channel shaped and are provided with ears which are received in slots in the ends of the screen case. These supporting members 54 and 55 are utilized for supporting a roller within the screen case. The roller includes a substantially rigid one piece metal tube 57 so that it will not bend appreciably upon tensioning of the screen. A pair of brackets 58 and 59 are secured by means of screws 60 to one end of the roller 57, these brackets forming a mounting spider for the roller. The brackets 58 and 59 are offset and extend substantially radially from the central axis of the roller to provide a plurality of substantially radially arranged latch members having latching surfaces 61. The spider formed by the brackets 58 and 59 is provided with a pin 62 which is rotatably mounted in a suitable hole in the supporting member 54. In this way, one end of the roller 57 is mounted for rotation in the screen case 49.

A bracket 64 may be mounted intermediate its ends in the roller 57 by means of screws 65. In a like manner a bracket 66 is secured to the other end of the roller 57 by screws 67. The brackets 64 and 66, forming spiders, are provided with holes for receiving a shaft 68 which shaft extends through a suitable hole in the supporting member 55 for supporting the other end of the roller 57. Here, the end of the shaft 68 is provided with a slot 71 for the reception of a screw driver or a similar tool for rotating the shaft to wind a spring 74 about the shaft to the desired extent. Thereafter, a pin is inserted through holes in the flanges of the support 55 and the slot 71 to prevent rotation of the shaft. A pair of washers 69 are located on each side of the bracket 64 and a pair of washers 70 are interposed between the bracket 66 and the supporting member 55. The shaft 68 is suitably upset or peened adjacent the brackets 64 and 66 to prevent longitudinal movement of the shaft with respect to the brackets 64 and 66.

A clip 72 is secured to the shaft 68 adjacent the bracket 64 as by welding indicated at 73. This clip 72 is provided with a pair of holes for receiving one end of a coil spring 74, the end of the coil spring 74 being bent over as indicated at 75 for securing that end of the coil spring to the clip 72. A clip 76 is secured to the bracket 66 as by welding indicated at 77. This clip 76 is provided with a pair of arms 78 for centering the other end of the coil spring 74. That end of the coil spring 74 is bent over an ear 79 on the clip 76 as indicated at 80 for the purpose of securing that end of the spring to the clip. Since one end of the spring 74 is secured to the stationary shaft 68 and the other end is secured to the roller 57 through the bracket 66, the spring, when wound, operates to rotate the roller 57 in one direction and yet permits rotation of the roller in the opposite direction.

One end of a flexible screen 82 is suitably secured to the roller 57 by means of an adhesive or the like. The flexible projection screen 82 may be made out of any suitable material such as a suitably treated cloth and it may be provided with a suitable picture projection surface such as a reflective, silvered surface 83. The other end of the flexible screen 82 is secured over a suspension slat 84 which may take the form of a rod or tube. The ends of the suspension slat 84 may be provided with suitable knobs 85. The ends of a leaf spring member 86 are secured as by rivets 87 to a pair of clips which are in turn secured by rivets 88 to the suspension slat 84. The leaf spring member 86 may be in the form of a substantial semi-circle in cross-section. A bracket 89 is secured to the spring member 86 by rivets 90 and the bracket 89 carries a bale 91. The bale 91 is utilized for unrolling the flexible screen from the roller out through the slot 50 in the screen case and is also utilized for holding the screen in picture exhibiting position by engaging over the hook portion 22 of the hook member 21. By reason of this construction there is provided a resilient means for securing the suspension slat 84 to the hook member 21 for supporting the projection screen 83 in picture exhibiting position.

A bracket 95 having a flange 96 provided with mounting holes 97 is secured to the mounting member 54 by means of rivets 98 extending through the mounting holes 97 and corresponding holes in the mounting member 54. The flange 96 of the bracket 95 is provided with a fan shaped opening 99. The bracket 95 is also provided with a flange 100 which is spaced laterally from the flange 96, and this flange 100 is provided with a hole 101 in alignment with the fan shaped opening 99, the hole 101 communicating with a slot 102. The bracket 95, between the flanges 96 and 100 is provided with cam members or surfaces including low dwells 103 and 105 and intermediate high dwell 104. A latch bar 107 is received in the fan shaped opening 99 and the hole 100 of the bracket 95. The latch bar 107 is provided with an enlarged end 108 located within the fan shaped opening 99, the narrower portion of the latch bar 107 being received in the hole 101 through the notch or slot 102. After the latch bar 107 is so located in the bracket 95 the slot 102 is closed to retain the same therein. The latch bar 107 is slidably mounted in the bracket 95 for sliding movement substantially parallel to the axis of the roller 57. The latch bar 107 is slidably movable from a retracted free position where the enlarged end 108 engages the flange 100 and an advanced locking position where a shoulder 111 on the latch bar 107 engages the flange 96. The latch bar 107 is also provided with a cam member or surface 110 which engages the cam members or surfaces 103, 104 and 105 in its various sliding positions. A spring 112 secured to the flange 96 of the bracket 95 engages the large end 108 of the latch bar 107 for maintaining the cam members 110, 103, 104 and 105 in engagement. As the latch bar 107 is slidably moved with respect to the bracket 95 it is also tilted about its longitudinal axis by the cam members or surfaces.

When the latch bar is in its retracted free position, as illustrated in dotted lines in Fig. 12 the latch bar is tilted to the position illustrated in Fig. 16 and it is held in this position by the spring 112 and the cam member 110 engaging in the low dwell 103 of the cam member of the bracket. As the latch bar 107 is moved from this retracted position toward the advanced position, the high dwell 104 of the cam member of the bracket is engaged by the cam member 110 of the latch bar to tilt the latch bar 107 about its longitudinal axis to the position illustrated in Fig. 15. Here the enlarged end 108 of the latch bar is, therefore, tilted outwardly beyond the path of movement of the latch members 58 and 59 of the roller supporting spider. Thus, this movement is in no way impeded by these latch members. When the latch bar 107 is completely moved to the advanced locking position, the spring 112 forces the cam member 110 into the low dwell 105 and the enlarged end 108 is tilted to the position illustrated in Fig. 13 in the path of movement of the latch members. The latch surfaces 61 on the latch members 58 and 59, when the latch bar 107 is in the advanced locking position, are engaged by the enlarged end 108 of the latch bar and prevent rotation of the screen supporting roll 57 in an unrolling direction. Here, the cam members 110 and 105 operate to releasably lock the latch bar 107 in the advanced locking position. Accordingly, by manually manipulating the latch bar 107, which extends outwardly through a hole in the end cap 51 and which is provided with a serrated end 109 to facilitate manipulation, the screen supporting roller 57 may be locked against unrolling at any desired position for the purpose of locking the screen in the screen case or for the purpose of locking the same in any extended position. When the latch bar 107 is moved to the retracted free position the roller 57 may be freely rotated since the latch bar is then moved out of the path of movement of the latch members on the roller 57.

When the projection screen of this invention is to be utilized for exhibiting pictures, the hook member 21 is moved to the desired position and clamped in that position by the nipping lever 19. The latch bar is moved to the retracted free position and the screen is then withdrawn from the screen case and the bale 91 is hooked over the hook member 21 so that the screen 82 assumes the position as shown in Fig. 3. The latch bar 107 is then moved to the advanced locking position to lock the roller 57 and prevent further unrolling of the screen 82. The nipping lever 34 in the handle member 25 is then manipulated and the handle member 25 is pushed downwardly along the post 11. In so doing, the resilient means 86 is tensioned for the purpose of applying tension to the flexible screen 82 and after the desired amount of tension is applied, the nipping lever is released and the handle member 25 is thereupon automatically locked in the position to maintain the desired tension on the projection screen. By so tensioning the screen 82 it is maintained in a substantially flat condition which makes it particularly adaptable for exhibiting projected three dimensional pictures. Since the roller 57 is a substantially rigid metal roller it will not bend or bulge upon tensioning of the screen and this effectively eliminates wrinkles and so forth in the screen.

When it is desired to lower the screen 82, the preferred method is to first release the tension at the case handle 25, remove the bale 91 from the extension hook 21 and retract the screen into the case. The latch bar 107 will ratchet until the screen is completely within the case and will then lock the screen into the case and prevent accidental "spilling" of the screen out of the case. It is not necessary to release the latch bar 107 to retract the screen, although this can be done if desired. Another method is to retract the extension rod and follow the same method as above. The latch bar is so constructed that it may be moved into the retracted free position while the screen is tensioned, but this is not recommended and is only supplied as a safety feature against accidental release. Since both the hook member 21 and the handle member 25 are adjustable in both directions with respect to the post 11 the position of the projection screen with respect to the supporting stand may be adjusted at will.

While for purposes of illustration, one form of this invention has been disclosed, other forms thereof may become apparent to those skilled in the art upon reference to this disclosure and, therefore, this invention is to be limited only by the scope of the appended claims.

I claim as my invention:

1. In a projection screen for use in exhibiting pictures and having a screen case, a spring actuated roller mounted in the screen case, and a flexible screen secured at one end to the roller and adapted to be automatically rolled thereon and to be unrolled therefrom to picture exhibiting position, in combination therewith, means for releasably locking the roller against rotation in the unrolling direction to retain the screen in the screen case when rolled upon the roller and to allow tensioning of the screen in picture exhibiting position and including a plurality of substantially radially extending latch members extending from one end of the roller, a latch bar, a bracket carried by the screen case adjacent said end of the roller and having means for slidably mounting the latch bar for movement substantially parallel to the axis of the roller between a retracted free position free from the latch members and an advanced locking position in the path of movement of said latch members, and means including spring means and cam members on said latch bar and bracket for releasably retaining said latch bar in its retracted free position of its advanced locking position.

2. In a projection screen for use in exhibiting pictures and having a screen case, a spring actuated roller mounted in the screen case, and a flexible screen secured at one end to the roller and adapted to be automatically rolled thereon and to be unrolled therefrom to picture exhibiting position, in combination therewith, means for releasably locking the roller against rotation in the unrolling direction to retain the screen in the screen case when rolled upon the roller and to allow tensioning of the screen in picture exhibiting position and including a plurality of substantially radially extending latch members extending from one end of the roller, a latch bar, a bracket carried by the screen case adjacent said end of the roller and having means for slidably mounting the latch bar for movement substantially parallel to the axis of the roller between a retracted free position free from the latch members and an advanced locking position in the path of movement of said latch members, and means including spring means and cam members on said latch bar and bracket for tilting said latch bar outwardly beyond the path of movement of said latch members as said latch bar is moved between its retracted free position and its advanced locking position to prevent said latch members from impeding such movement.

3. In a projection screen for use in exhibiting pictures and having a screen case, a spring actuated roller mounted in the screen case, and a flexible screen secured at one end to the roller and adapted to be automatically rolled thereon and to be unrolled therefrom to picture exhibiting position, in combination therewith, means for releasably locking the roller against rotation in the unrolling direction to retain the screen in the screen case when rolled upon the roller and to allow tensioning of the screen in picture exhibiting position and including a plurality of substantially radially extending latch members extending from one end of the roller, a latch bar, a bracket carried by the screen case adjacent said end of the roller and having means for slidably mounting the latch bar for movement substantially parallel to the axis of the roller between a retracted free position free from the latch members and an advanced locking position in the path of movement of said latch members, and means including spring means and cam members on said latch bar and bracket for releasably retaining said latch bar in its retracted free position or its advanced locking position and for tilting said latch bar outwardly beyond the path of movement of said latch members as said latch bar is moved between its retracted free position and its advanced locking position to prevent said latch members from impeding such movement.

4. In a projection screen for use in exhibiting pictures and having a screen case, a spring actuated roller mounted in the screen case, and a flexible screen secured at one end to the roller and adapted to be automatically rolled thereon and to be unrolled therefrom to picture exhibiting position, in combination therewith, means for releasably locking the roller against rotation in the unrolling direction to retain the screen in the screen case when rolled upon the roller and to allow tensioning of the screen in picture exhibiting position and including a plurality of substantially radially extending latch members extending from one end of the roller, a latch bar, a bracket carried by the screen case adjacent said end of the roller and having a fan shaped slot therein for slidably mounting the latch bar for movement substantially parallel to the axis of the roller between a retracted free position free from the latch members and an advanced locking position in the path of movement of said latch members and for tiltably mounting the latch bar for tilting movement about its longitudinal axis between a normal position within the circular path of movement of said latch members and a tilted position outwardly beyond the circular path of movement of said latch members, spring means interposed between the bracket and the latch bar for normally tilting the latch bar to its said normal position, and cam means on said latch bar and bracket for permitting said spring means to tilt said latch bar toward its normal position when said latch bar is in the retracted free position and to releasably retain said latch bar in said position, for tilting said latch bar against the action of the spring means to its tilted position when the latch bar is moved from its retracted free position to its advanced locking position without being impeded in such movement by the latch members, and for permitting said spring means to tilt said latch bar to its normal position when said latch bar is in the advanced locking position for engaging one of said latch members and to releasably retain said latch bar in said position.

References Cited in the file of this patent

UNITED STATES PATENTS

| | | |
|---|---|---|
| 1,946,639 | Riddell | Feb. 13, 1934 |
| 2,696,249 | Prokop et al. | Dec. 7, 1954 |